United States Patent [19]

Kristl et al.

[11] Patent Number: 5,129,368
[45] Date of Patent: Jul. 14, 1992

[54] INTAKE MANIFOLD FOR AN INTERNAL COMBUSTION ENGINE

[75] Inventors: Manfred Kristl, Trebur; Manfred Hellerbach, Heidenrodt T, both of Fed. Rep. of Germany

[73] Assignee: General Motors Corporation, Detroit, Mich.

[21] Appl. No.: 694,613

[22] Filed: May 2, 1991

[30] Foreign Application Priority Data

May 26, 1990 [DE] Fed. Rep. of Germany ........ 4017049

[51] Int. Cl.$^5$ ............................................. F02M 35/10
[52] U.S. Cl. .................................. 123/52 MB
[58] Field of Search ......... 123/52 M, 52 MB, 52 MC, 123/52 MV, 52 MF, 52 ML

[56] References Cited

U.S. PATENT DOCUMENTS

| 4,794,885 | 1/1989 | Honda et al. ................ | 123/52 M |
| 4,840,146 | 6/1989 | Yanagisawa et al. ......... | 123/52 MC |
| 4,932,378 | 6/1990 | Hitomi et al. ................ | 123/432 |
| 4,977,865 | 12/1990 | Hiraoka et al. ............... | 123/52 MB |

FOREIGN PATENT DOCUMENTS

| 0182223 | 5/1986 | European Pat. Off. ......... | 123/52 M |
| 0276773 | 8/1988 | European Pat. Off. ......... | 123/52 M |
| 2913264 | 10/1980 | Fed. Rep. of Germany . | |
| 2613428 | 10/1988 | France ............................ | 123/52 M |

Primary Examiner—David A. Okonsky
Attorney, Agent, or Firm—Gordon F. Belcher

[57] ABSTRACT

In an intake manifold, long individual intake pipes (2,2a,2b,2c) lead from a collective intake pipe (1) to the cylinders (3,3a,3b,3c) of an internal combustion engine. A transverse pipe (5) communicates with the individual intake pipes (2,2a,2b,2c) via resonance pipes (6,6a,6b,6c) which lead to the individual intake pipes (2,2a,2b,2c) from the transverse pipe (5). Communication with the transverse pipe (5) is only via the resonance pipes (6,6a,6b,6c). Cutoff devices (7) enable blockage of the connection between the transverse pipe (5) and the individual intake pipes (2,2a,2b,2c) at low engine speeds.

6 Claims, 1 Drawing Sheet

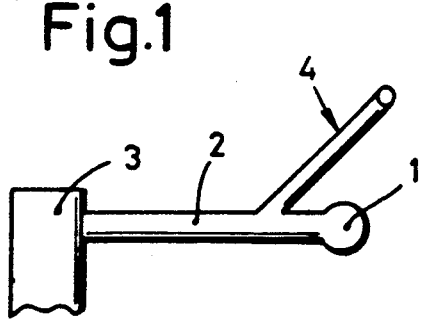
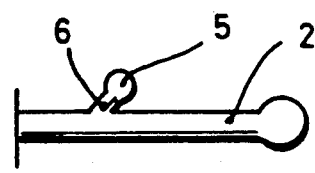
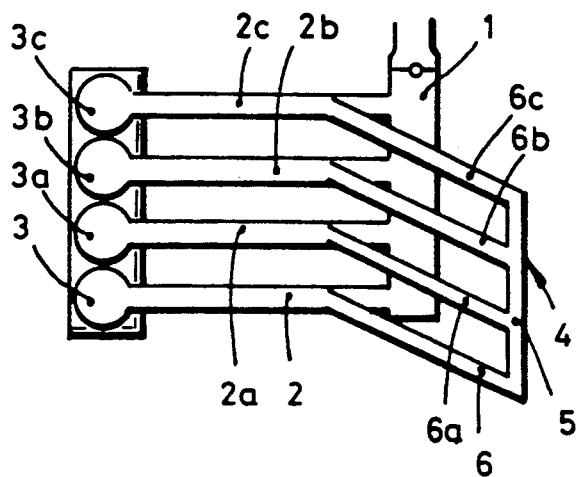
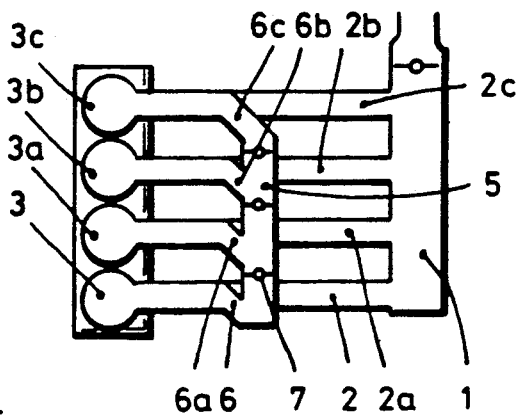
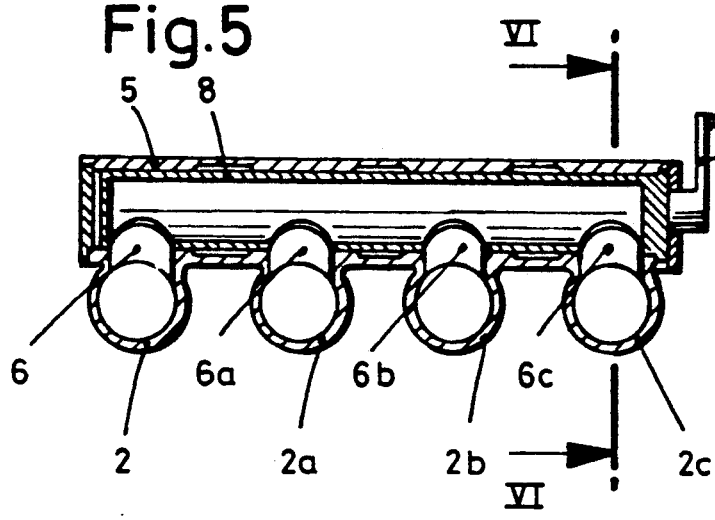
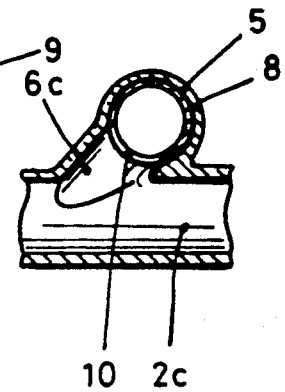

1

INTAKE MANIFOLD FOR AN INTERNAL COMBUSTION ENGINE

TECHNICAL FIELD

The invention pertains to an intake manifold for an internal combustion engine in which individual intake pipes run from a common collective intake pipe for several cylinders to the individual cylinders.

BACKGROUND

An intake manifold is described in German OS 29 13 264. In this system, the individual intake pipes are relatively long. This is advantageous in the intermediate range of engine speeds during which the gas vibrations created in the individual intake pipes increase the air delivery. However, it has been found that the long individual intake pipes substantially reduce the engine power in the upper range of engine speeds as a result of the reduction of the air delivery.

To avoid this disadvantage, intake manifolds have already been developed in which a short and a long individual intake pipe each lead to a cylinder from a collective intake pipe which serves as an air distributor. A valve which opens during high engine speeds is positioned in the short individual intake pipe. This valve is closed during low and intermediate engine speeds. As a result, during low and intermediate engine speeds the short individual intake pipe is obstructed causing the intake air to flow through the long individual intake pipe to the cylinder. Engine performance during low an intermediate engine speeds is enhanced by intake air flow through long intake pipes. During high engine speeds when the valve is opened, the intake air flows through the short individual intake pipe to the cylinder. Engine performance during high speeds is enhanced by intake air flow through short intake pipes. With such intake manifolds it has been shown that during the flow through a long individual intake pipe, substantial flow losses can arise at the junction between the short and long individual intake pipes due to the deflection of the air flow caused by the angle between the long individual intake pipe and pipe leading away from the junction. The installation of the individual intake pipes can also be difficult if a single collective intake pipe is used.

SUMMARY OF THE INVENTION

The present invention provides an intake manifold having an efficient configuration that facilitates delivery of air to the cylinders of an engine over a broad range of engine speeds resulting in high engine power. The intake manifold comprises individual intake pipes extending between the cylinders and a collective intake pipe, and a connecting pipe connected to the individual intake pipes. Communication with the connecting pipe is only via the individual intake pipes.

With such an intake manifold, resonance can be achieved in the connecting pipe. As a result, the engine power is increased during high engine speeds, without substantial impairment of the engine power in the intermediate range of engine speeds.

A simple configuration of the intake manifold includes a connecting pipe comprising individual resonance pipes opening into the individual intake pipes and a transverse pipe connected to the end of each resonance pipe opposite the individual intake pipes.

A substantially constant torque curve is obtained if, according to another configuration of the invention, a cutoff device is provided in the connecting pipe to block the communication between the individual intake pipes via the connecting pipe during selected engine speeds. As a result, the connecting pipe can allow the communication during high engine speeds and obstruct the communication during the other engine speeds so that the connecting pipe does not decrease the power of the internal combustion engine during the other engine speeds.

Construction and operation of the cutoff device is facilitated if it is provided in the transverse pipe adjacent to the openings of the resonance pipes.

Tests have shown that the improvements in engine performance resulting from the connecting pipe are greatest if the section of each individual intake pipe leading from the resonance pipe connected thereto, forms an obtuse angle with respect to the resonance pipe connected thereto.

The intake manifold has a reduced size, but nevertheless produces high engine power if, according to another configuration of the invention, the resonance pipes are short pipe sleeves and the transverse pipe runs immediately above or below the individual intake pipes.

The cutoff devices can comprise throttle valves thereby reducing their complexity.

A tight seal between the cutoff devices and resonance pipes is facilitated if the cutoff devices are formed by a rotary slide valve positioned in the transverse pipe which communicates with each resonance pipe.

These and other features and advantages of the invention will be more fully understood from the following description of certain specific embodiments of the invention taken together with the accompanying drawings.

BRIEF DRAWING DESCRIPTION

In the drawings:

FIG. 1 is a schematic side view of an intake manifold according to the present invention;

FIG. 2 is a perspective top view of the intake manifold of FIG. 1;

FIG. 3 is a schematic side view of a second embodiment of an intake manifold according to the present invention;

FIG. 4 is a perspective top view of the intake manifold of FIG. 3;

FIG. 5 is a longitudinal cross-sectional view through a transverse pipe of a third embodiment of the intake manifold according to the invention; and FIG. 6 is a cross sectional view through the intake manifold generally in the plane indicated by line 6—6 of FIG. 5.

Corresponding reference characters indicate corresponding parts throughout the several views of the drawings.

DETAILED DESCRIPTION

Referring to the drawings, FIG. 1 shows a collective intake pipe 1 from which an individual intake pipe 2 leads to a cylinder 3. Other individual intake pipes also lead from the collective intake pipe 1 to the other cylinder. The invention requires a connecting pipe 4 which connects the individual intake pipes 2 to one another.

FIG. 2 shows four individual intake pipes 2,2a,2b,2c leading from the collective intake pipe 1 to four cylinders 3,3a,3b,3c. FIG. 2 also shows that the connecting pipe 4 connects the four individual intake pipes 2,2a,2b,2c with one another. To enable this connection, the connecting pipe 4 consists of a transverse pipe 5 from which four resonance pipes 6,6a,6b,6c lead to the individual intake pipes 2,2a,2b,2c. The resonance pipes 6,6a,6b,6c are connected to respective sections of the individual intake pipes 2,2a,2b,2c which each lead to a respective cylinder 3,3a,3b,3c. An obtuse angle is formed between the section of each individual intake pipe 2,2a,2b,2c leading from the resonance pipe 6,6a,6b,6c, connected thereto, and the resonance pipe connected thereto. This obtuse angle is also shown in FIG. 1.

In the embodiment shown in FIGS. 3 and 4, the resonance pipes 6,6a,6b,6c are constituted by short pipe sleeves so that the transverse pipe 5 runs directly above the individual intake pipes 2,2a,2b,2c. In addition, in the version in FIG. 4, the cutoff devices 7 comprise throttle valves in the transverse pipe 5. These cutoff devices 7 are switched so that during low engine speeds they obstruct the communication between the resonance pipes 6,6a,6b,6C via the transverse pipe 5, and during high engine speeds, they open allowing the communication.

The cutoff devices 7 may also be positioned, instead of in the transverse pipe 5, in the individual resonance pipes 6,6a,6b,6c immediately in front of their openings into the individual intake pipes 2,2a,2b,2c.

FIG. 5 shows a transverse pipe 5 in which a rotary slide valve 8 is positioned which, by means of a switch lever 9, can be rotated between an open position wherein it allows communication between the transverse pipe 5 and resonance pipes 6,6a,6b,6c and a closed position wherein the rotary slide valve obstructs this communication. FIG. 6 shows how the resonance pipe 6c enables communication between the transverse pipe 5 and an individual intake pipe 2c. There is also an opening 10 in the rotary slide valve 8 through which this communication is allowed with the rotary slide valve in the open position. The individual intake pipes 2,2a,2b,2c may be straight or curved.

Corresponding reference characters indicate corresponding parts throughout the several views of the drawings. While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

The embodiments of the invention in which an exclusive property or privilege we claimed are defined as follows:

1. An intake manifold for an internal combustion engine in which individual intake pipes lead from a collective intake pipe common to the individual cylinders, characterized by the individual intake pipes between the cylinders and the collective intake pipe being connected by a connecting pipe wherein communication with said connecting pipe is only via the individual intake pipes, and said intake manifold characterized by said connecting pipe comprising resonance pipes opening into the individual intake pies and a transverse pipe connecting said respective resonance pipes with one another at their ends opposite their openings into the individual intake pipes, said intake manifold further characterized by the provision of cutoff devices in said connecting pipe, said cutoff devices enabling blocking on the connection between the individual intake pipes with one another via said transverse pipe.

2. An intake manifold according to claim 1, characterized by said cutoff devices in said transverse pipe being provided between the respective connections of said resonance pipes to said connecting pipe.

3. An intake manifold according to claim 1, characterized by said resonance pipes comprising short pipe sleeves, and said transverse pipe is transverse to the individual intake pipes.

4. An intake manifold according to claim 1, characterized by said cutoff devices comprising throttle valves.

5. An intake manifold according to claim 1, characterized by said cutoff devices comprising a rotary slide valve positioned in said transverse pipe which is connected to all of said resonance pipes.

6. An intake manifold for an internal combustion engine in which individual intake pipes lead from a collective intake pipe common to the individual cylinders, characterized by the individual intake pipes between the cylinders and the collective intake pipe being connected by a connecting pipe wherein communication with said connecting pipe is only via the individual intake pipes, and said intake manifold characterized by said connecting pipe comprising resonance pipes opening into the individual intake pipes and a transverse pipe connecting said responsive resonance pipes with one another at their ends opposite their openings into the individual intake pipes, said intake manifold further characterized by the section of each individual intake pipe leading from said resonance pipe connected thereto forming an obtuse angle with respect to said resonance pipe connected thereto.

* * * * *